United States Patent
Krahnstoever et al.

(10) Patent No.: US 7,317,812 B1
(45) Date of Patent: Jan. 8, 2008

(54) METHOD AND APPARATUS FOR ROBUSTLY TRACKING OBJECTS

(75) Inventors: Nils Krahnstoever, State College, PA (US); Emilio Schapira, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 820 days.

(21) Appl. No.: 10/618,393

(22) Filed: Jul. 12, 2003

Related U.S. Application Data

(60) Provisional application No. 60/426,574, filed on Nov. 15, 2002.

(51) Int. Cl.
*G06K 9/00* (2006.01)
(52) U.S. Cl. ...................... 382/103; 382/154
(58) Field of Classification Search ............... 382/154, 382/103
See application file for complete search history.

(56) References Cited

U.S. PATENT DOCUMENTS

| | | | |
|---|---|---|---|
| 5,323,470 A * | 6/1994 | Kara et al. .................. 382/103 |
| 6,072,903 A * | 6/2000 | Maki et al. .................. 382/190 |
| 6,205,231 B1 | 3/2001 | Isadore-Barreca et al. | |
| 6,263,088 B1 | 7/2001 | Crabtree et al. | |
| 6,272,250 B1 | 8/2001 | Sun et al. | |
| 6,363,160 B1 | 3/2002 | Bradski et al. | |
| 6,394,557 B2 | 5/2002 | Bradski | |
| 6,396,476 B1 | 5/2002 | Bradski et al. | |
| 6,404,900 B1 | 6/2002 | Qian et al. | |
| 6,434,255 B1 | 8/2002 | Harakawa | |
| 6,658,136 B1 * | 12/2003 | Brumitt ...................... 382/103 |
| 6,985,620 B2 * | 1/2006 | Sawhney et al. ........... 382/154 |
| 6,999,624 B1 * | 2/2006 | Nelson ........................ 382/224 |
| 7,106,885 B2 * | 9/2006 | Osterweil et al. ........... 382/103 |
| 2001/0000025 A1 | 3/2001 | Darrell et al. | |
| 2001/0008561 A1 * | 7/2001 | Paul et al. .................. 382/103 |

FOREIGN PATENT DOCUMENTS

WO WO-02/07839 A2 1/2002

OTHER PUBLICATIONS

Moeslund T.B., et al.,4th IEEE Int. Conf. Automatic Face and Gesture Rec., 2000, p. 362-367.
Goncalves L., et al., Proc. International Conference on Computer Vision. 1995. p. 764-770.
Filova V., et al., Machine Vision and Application, 1998. 10: p. 223-231.

(Continued)

*Primary Examiner*—Jingge Wu
*Assistant Examiner*—Kathleen Yuan

(57) ABSTRACT

The present invention pertains generally to the field of computer graphics user interfaces. More specifically, the present invention discloses a video image based tracking system that allows a computer to robustly locate and track an object in three dimensions within the viewing area of two or more cameras. The preferred embodiment of the disclosed invention tracks a person's appendages in 3D allowing touch free control of interactive devices but the method and apparatus can be used to perform a wide variety of video tracking tasks. The method uses at least two cameras that view the volume of space within which the object is being located and tracked. It operates by maintaining a large number of hypotheses about the actual 3D object location.

10 Claims, 13 Drawing Sheets

OTHER PUBLICATIONS

Wu A., et al., 4th IEEE Int. Conf. Automatic Face and Gesture Rec., 2000. p. 536-542.
Ahmad S., A Usable Real-Time 3D Hand Tracker, IEEE Asian Conference. 1994.
Davis J. et al., Proc. of the 28th asilomer conference on signals, systems, and computer. 1994.
Struman D.J., et al., Proc. ACM SIGGRAPH Symposium on User Interfaces, 1989, VA. p. 19-24.
Pavlovic, V.I.,et al.,IEEE Transactions on PAMI,Jul. 1997. 19(7):pp. 677-695.
Lee, J., et al.,IEEE Computers Graphics and Applications. Sep. 1995.
Freeman, W.T. et al.,Intl Workshop on Automatic Face and Gesture Recognition IWAFGR95.Jun. 1995.
Kuch, J.J. et al.,Proceedings of International Conference on Computer Vision,Jun. 1995:Cambridge, MA.
Krahnstoever, N. et al.,IEEE Conf. CVPR, Hawaii, Technical Sketches, 2001.
Polat, E., et al.,Proc. IEEE International Conference on Image Processing, 2001.
Sharma, R., et al.,Proc. Intl. Conference on Face and Gesture Recognition,Grenoble,France,Mar. 2000.
Sharma, R., et al.,Proceedings of the IEEE. 1998. pp. 853-869.
Krahnstoever N. et al.,Proc. IEEE Workshop on Detection and Recognition of Events in Video,Jul. 2001.
Polat, E., et al.,IEEE Workshop on Multi Object Tracking at ICCV, 2001.

* cited by examiner

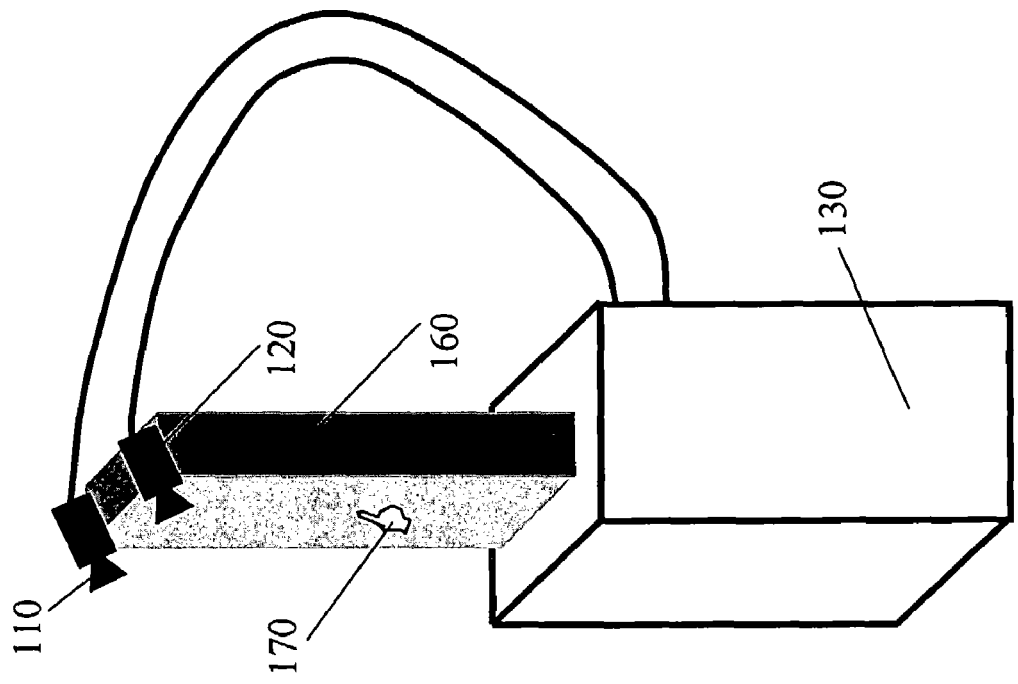
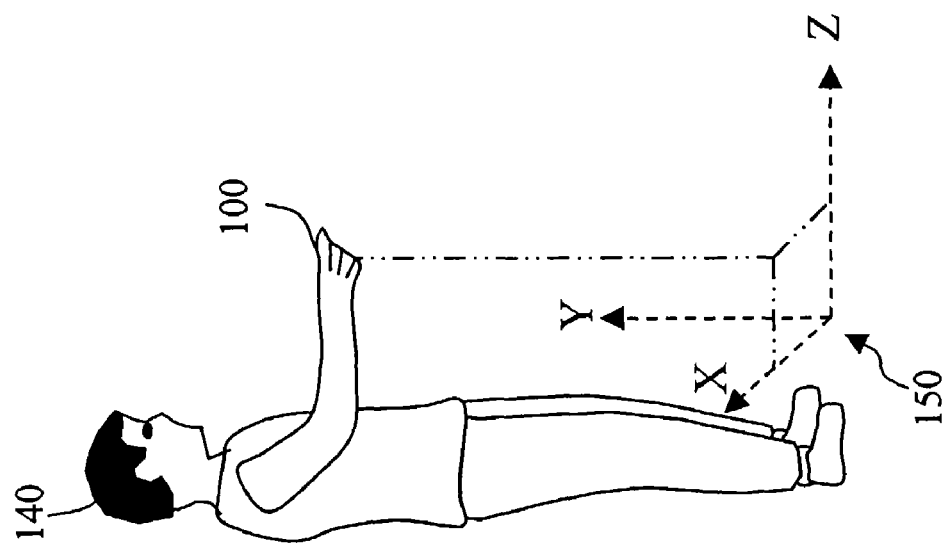
FIG 1

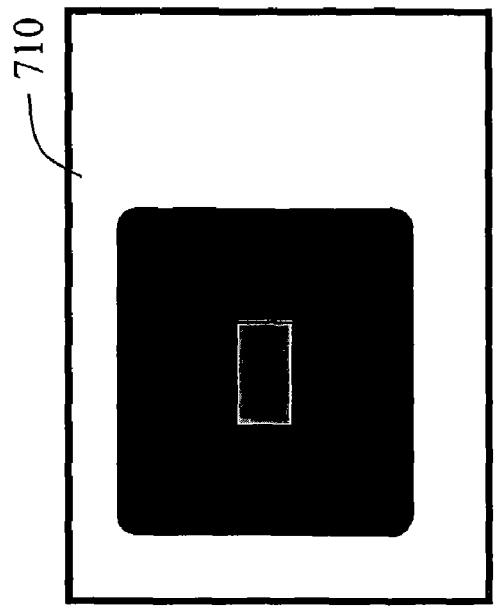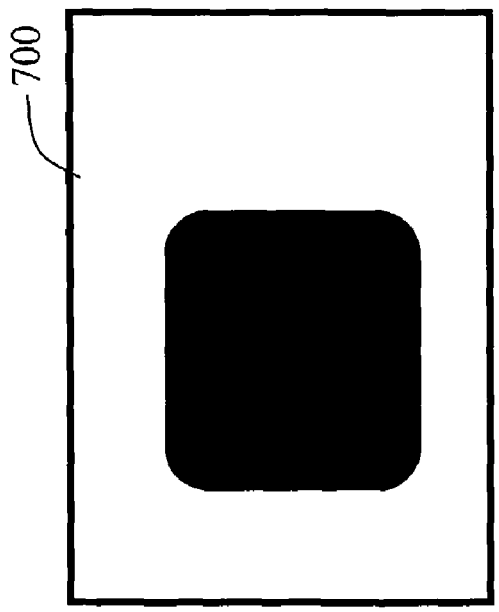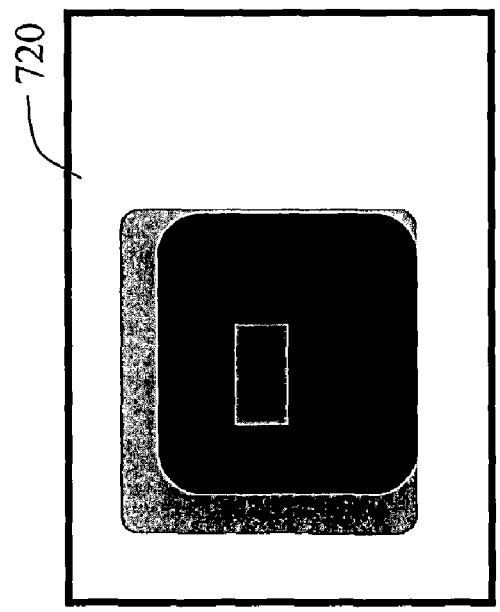
FIG 6

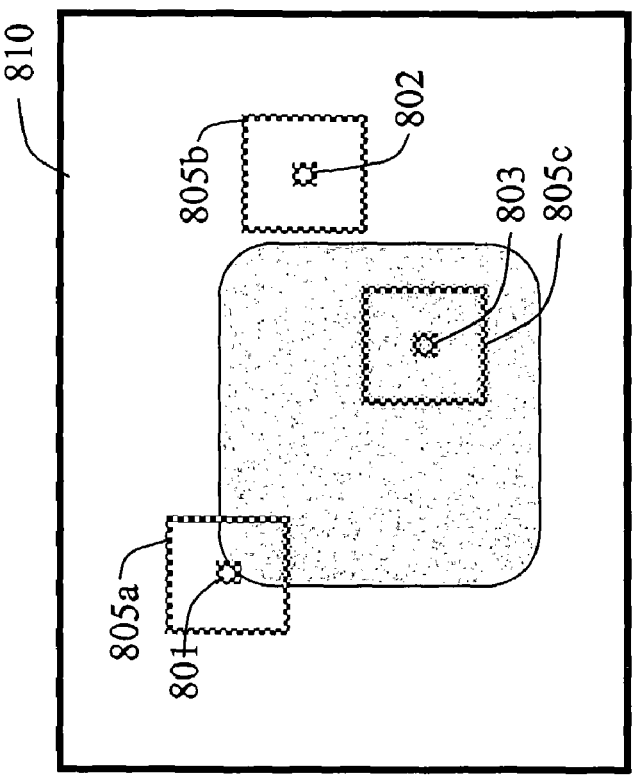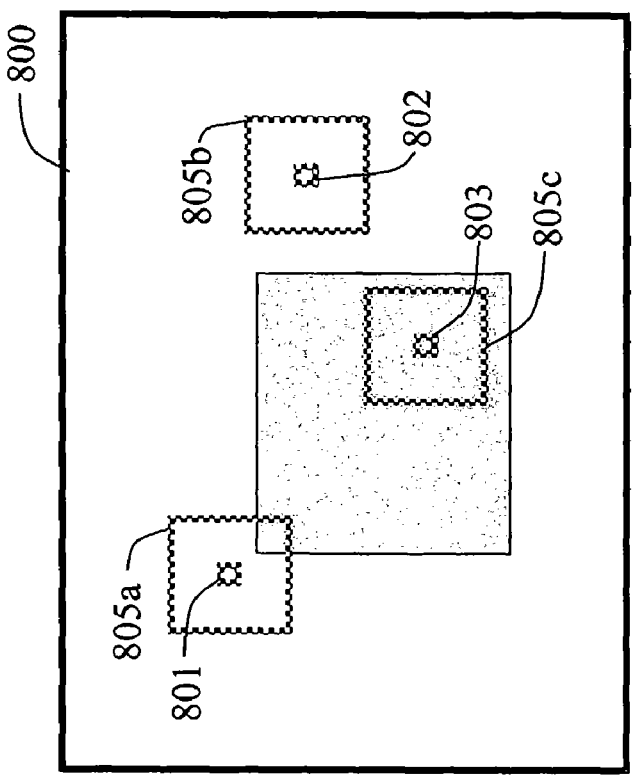
FIG 7

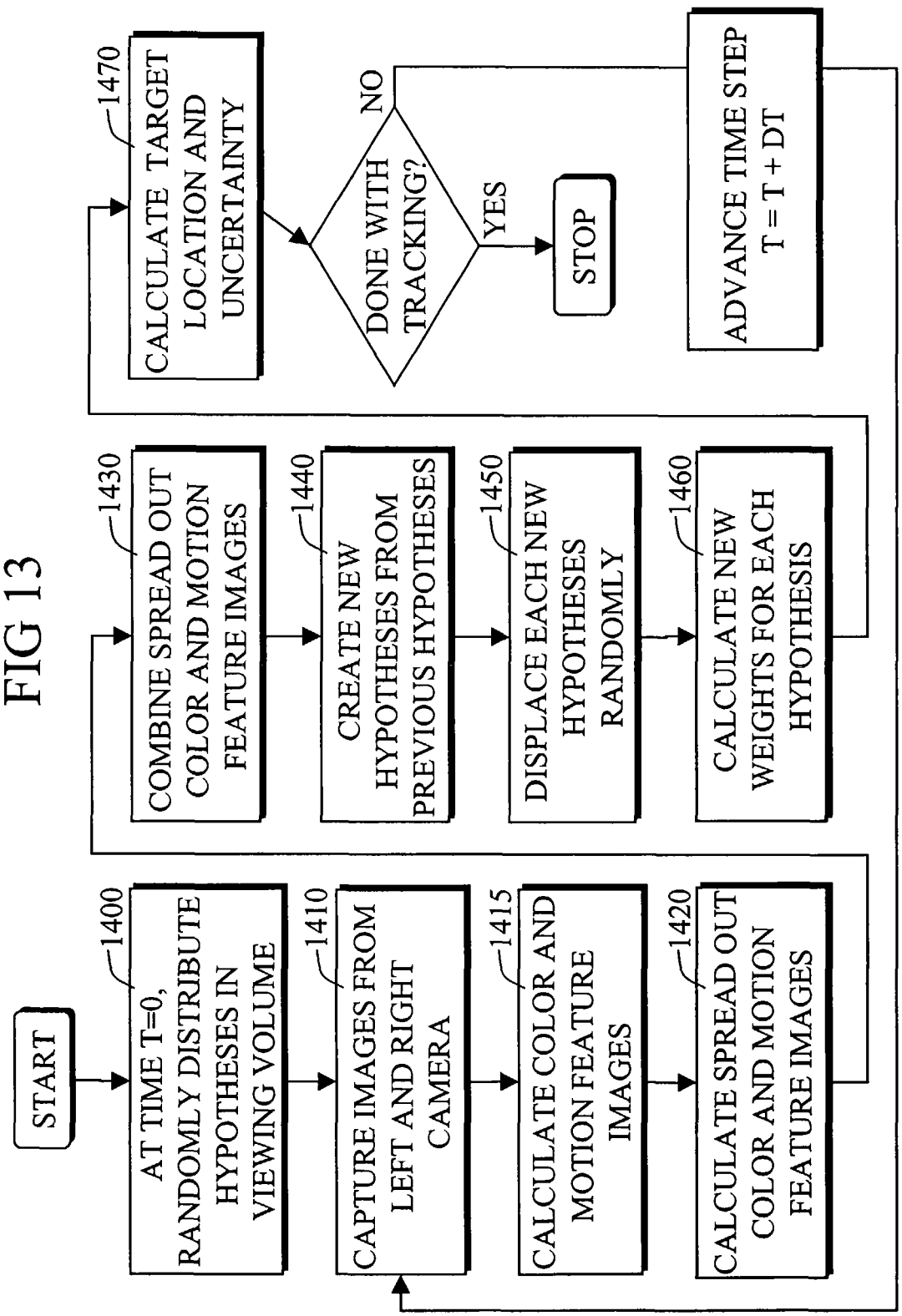

METHOD AND APPARATUS FOR ROBUSTLY TRACKING OBJECTS

CROSS-REFERENCE TO RELATED APPLICATIONS

This application is based on and claims priority to U.S. Provisional Application No. 60/426,574, filed Nov. 15, 2002, which is fully incorporated herein by reference.

FEDERALLY SPONSORED RESEARCH

Not Applicable

SEQUENCE LISTING OR PROGRAM

Not Applicable

BACKGROUND OF THE INVENTION

Field of the Invention

The present invention pertains generally to the field of computer graphics user interfaces. More specifically, the present invention discloses a video image based tracking system that allows a computer to robustly locate and track an object in three dimensions within the viewing area of two or more cameras. The preferred embodiment of the disclosed invention tracks a person's appendages in 3D allowing touch free control of interactive devices but the method and apparatus can be used to perform a wide variety of video tracking tasks.

BACKGROUND OF THE INVENTION

Several video tracking systems are well known in the art. However, video tracking systems heretofore known, lack many of the functional, performance and robustness capabilities as the present invention.

The method of Harakawa, U.S. Pat. No. 6,434,255, also utilizes two video sensors, but requires specialized infrared cameras. Furthermore, additional hardware is required to provide infrared illumination of the user. Finally, the system needs a large mechanized calibration apparatus that involves moving a large marking plate through the space that is later occupied by the user. During the calibration procedure, the movement of the plate has to be precisely controlled by the computer.

The method of Hildreth et. al, International Patent. WO 02/07839 A2, determines the 3D locations of objects in the view of cameras by first extracting salient features from each image and then to pair up these two sets to find points in each of the two images that correspond to the same point in space. It is well known in the art, that this feature matching approach takes a lot of computational resources and that it easily fails in situations where no or very few clean feature sets can be extracted, where occlusion prevents pairing of a feature in one image with a point in the second image. It is common to pair two features that do not correspond to the same location in space, yielding an entirely incorrect 3D location estimate. Finally, their method requires additional processing based on the stereo information calculated to determine the actual location of the object to be tracked, with many more computational steps as the present invention.

The method of Darrell et. al, US 2001/0000025 A1, is also based on two cameras but also requires the calculation of a disparity image, which is faced with exactly the same challenges as the above described method of Hildreth et. al.

The methods of Bradski, U.S. Pat. No. 6,394,557 and U.S. Pat. No. 6,363,160, are based on using color information to track the head or hand of a person in the view of a single camera. The use of a single camera does not yield any 3D coordinates of the objects that are being tracked. Furthermore, it is well known, that the use of only color information and a single camera in general is insufficient to track small, fast moving objects in cluttered environment, their method is hence much less general and only workable in certain specialized environments. In particular, their method will fail, if for example the user holds his hand in front of his face.

The method of Crabtree et. al, U.S. Pat. No. 6,263,088, is also based on a single camera and designed to track people in a room seen from above. The use of a single camera does not yield any 3D coordinates of the objects that are being tracked.

The method of Jolly et. al, U.S. Pat. No. 6,259,802, is also based on a single camera and requires a means to extract and process contour information from an image. Contour extraction is both time consuming and prone to error The method of Qian et. al, U.S. Pat. No. 6,404,900, is designed to track human faces in the presence of multiple people. The method is also based on a single camera, yielding no 3D information, utilizes only color information and is highly specialized to head tracking, making it unsuitable for alternative application domains and targets.

The method of Sun et. al, U.S. Pat. No. 6,272,250, is also based on a single camera or video and requires an elaborate color clustering approach, making their method computationally expensive and not suitable for tracking general targets in 3D.

The method of Moeslund T. B., et al., 4th IEEE Int. Conf. Automatic Face and Gesture Rec., 2000, p. 362-367, utilizes color segmentation of the hand and the head in two cameras. This approach fails if the segments of head and hand come too close to each other.

The methods of Goncalves L., et al., Proc. International Conference on Computer Vision, 1995, p. 764-770, and Filova V., et al., Machine Vision and Application, 1998, 10: p. 223-231, perform model based tracking of a human arm in a single camera view. This approach obtains 3D information even in a single camera image, however, model based tracking as described in their paper is computationally extremely expensive and not suitable for practical application. Furthermore, the operating conditions are very constrained requiring the person whose arm is tracked to assume a very specific pose with respect to the camera.

The method of Wu A., et al., 4th IEEE Int. Conf. Automatic Face and Gesture Rec., 2000, p. 536-542, is also a model based approach and requires the detection of a users elbow and shoulder, which is difficult to perform outside of very constrained environments. More specifically, their method is based on skin color cues and implicitly assumes that the user, whose arm is being tracked, wears short-sleeved shirts, thus very much limiting the domain in which their method would be useful.

The method of Ahmad S., A Usable Real-Time 3D Hand Tracker, IEEE Asian Conference, 1994, is able to track a human hand held between a camera and a table, where the camera is pointed at the table with the imaging sensor parallel to the table surface. Their method is very specific in that it is only usable in a situation where the user, whose hand is being tracked, is sitting at a table with his hand at a particular location held in a particular pose, and thus lacks generality.

SUMMARY

A method for locating and tracking objects is disclosed. The method uses at least two cameras that view the volume of space within which the object is being located and tracked. It operates by maintaining a large number of hypotheses about the actual 3D object location. The set of hypotheses is continuously updated based on incoming video information. First, each hypothesis is evaluated based on information obtained from the video cameras such as motion and color. Based on the obtained values, a new set of hypothesis is generated and the location of each hypothesis is randomly varied. The mean of the hypothesis set forms the final 3D object location result. The covariance of the set gives an estimate of the location uncertainty.

DRAWINGS

Figures

FIG. 1 illustrates a preferred embodiment of the presented invention where a person's hand is tracked in 3D by two cameras.

FIG. 6 illustrates how to spatial spread out a cue response image.

FIG. 7 illustrates how two spread out cue response images are combined into a single combined cue response image.

FIG. 13 shows the overview of the tracking algorithm.

DETAILED DESCRIPTION OF THE INVENTION

Figure 2:
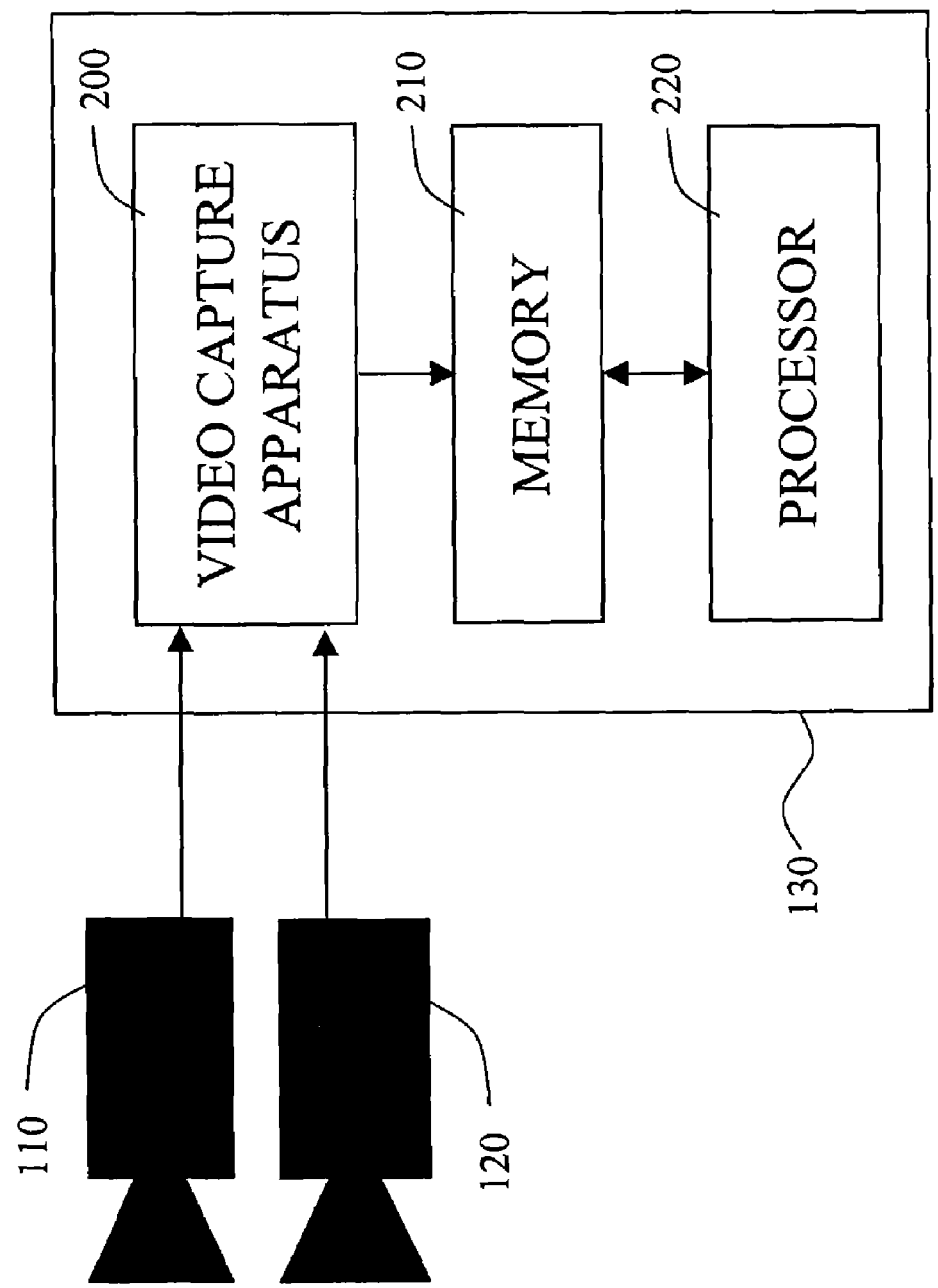
FIG. 2 is a block diagram showing the hardware components of the tracking system.

A method and apparatus for tracking an object in three dimensions is disclosed. Although the presented embodiment describes tracking a person's hand, one with ordinary skills in the art understands that the presented invention not only pertains to tracking a person's hand but also general objects if the color of the object to be tracked is known. Furthermore, it will be apparent for one skilled in the art that certain details are not required in order to practice the present invention.

Object Tracking System Overview

A preferred embodiment of the disclosed invention is shown is illustrated in FIG. 1. Two color cameras 110 and 120 are connected to a computer system 130. The cameras are pointed at and capture a plurality of images of a hand 100 of a person 140 that is in the viewing area of the cameras. In the illustrated embodiment, the cameras are located on top of a stand looking down at the object 100 to be tracked. However, other viewing configurations such as the cameras being located on the floor, looking up, or asymmetrical configurations with one camera on top and the other camera on the floor are possible. The disclosed method and apparatus continuously determines the 3D hand location in a coordinate system 150 from the video data captured by the cameras.

The embodiment in FIG. 1, which uses the teachings of the present invention, enables a person to point at the terminal display 160 and to perform selections of items shown on the screen. The method enables this remote control of the terminal by tracking the users hand in 3D and by showing a hand symbol 170 on the screen that represents the location of the users hand with respect to the terminal. Selection can be performed by moving the hand towards the screen.

As illustrated in FIG. 1 and shown in more detail in FIG. 2, the cameras 110 and 120 are connected to a computer system 130. The computer system 130 contains an apparatus 200 for capturing the video data that is captured by the cameras. In the preferred embodiment, this apparatus 200 is an IEEE 1394 digital video interface and the cameras 110 and 120 IEEE 1394 compatible cameras. However for one with ordinary skills in the art it will be apparent that other embodiments, for example using television cameras and frame grabbers, are possible and equivalent. The video capture apparatus transfers the images to a computer memory 210 of the computer system that is accessible by a processing device 220.

Figure 3:
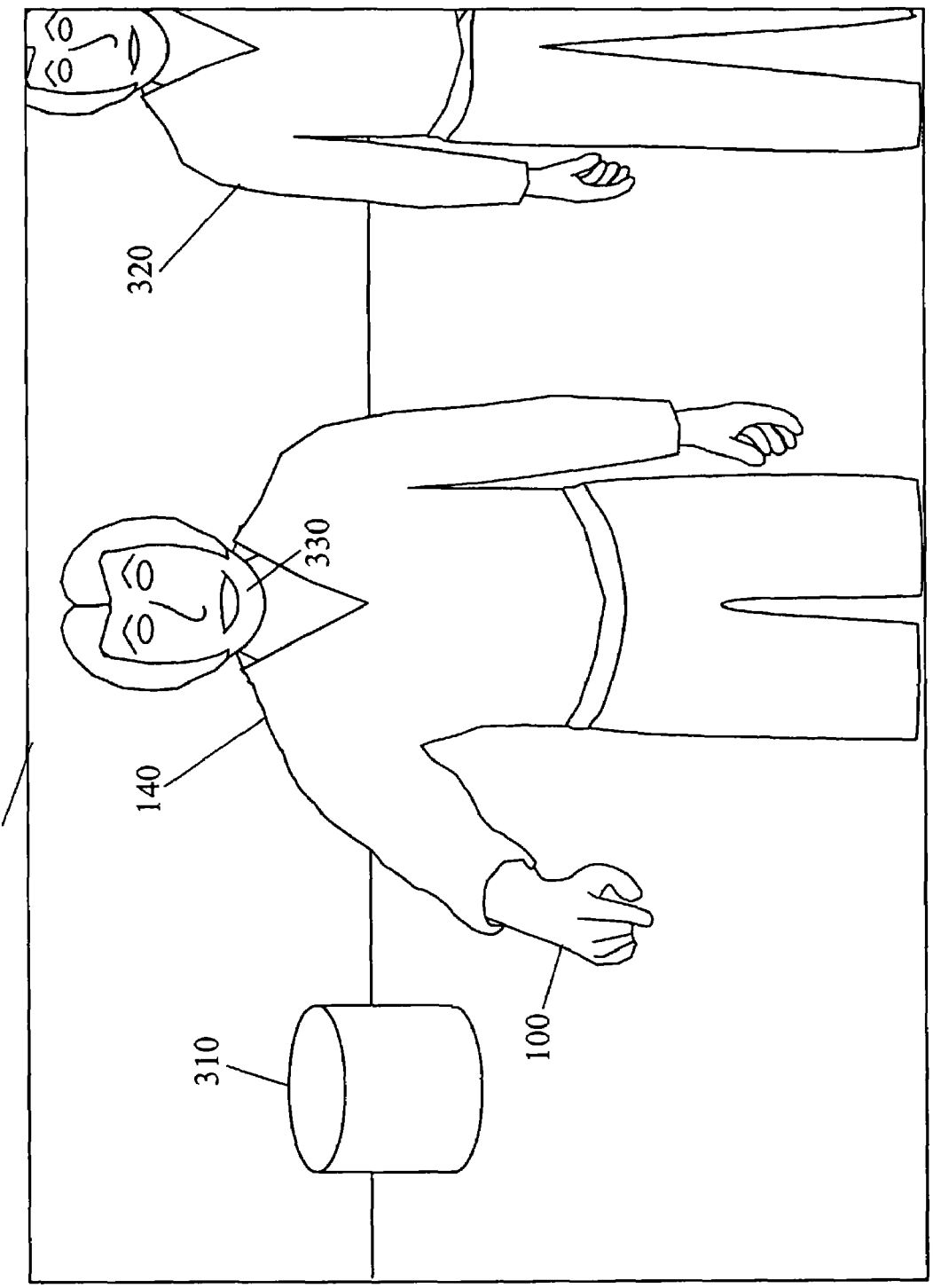
FIG. 3 illustrates a typical view of one of the system cameras.

FIG. 3 illustrates a typical task that the disclosed invention solves. It shows a typical camera view 300 that is captured by either of the cameras 110 and 120 showing the person 140 stretching out the arm and hand 100. Tracking the target object (the hand 100) is challenging because of the presence of other distracting objects in the camera view such as objects in the background 310 that have similar color as the hand 100, other people 320 and also the face 330 of the user 310 as the color of the skin of the person 310 and other people 320 can closely match the color of the target object 310.

Figure 4:
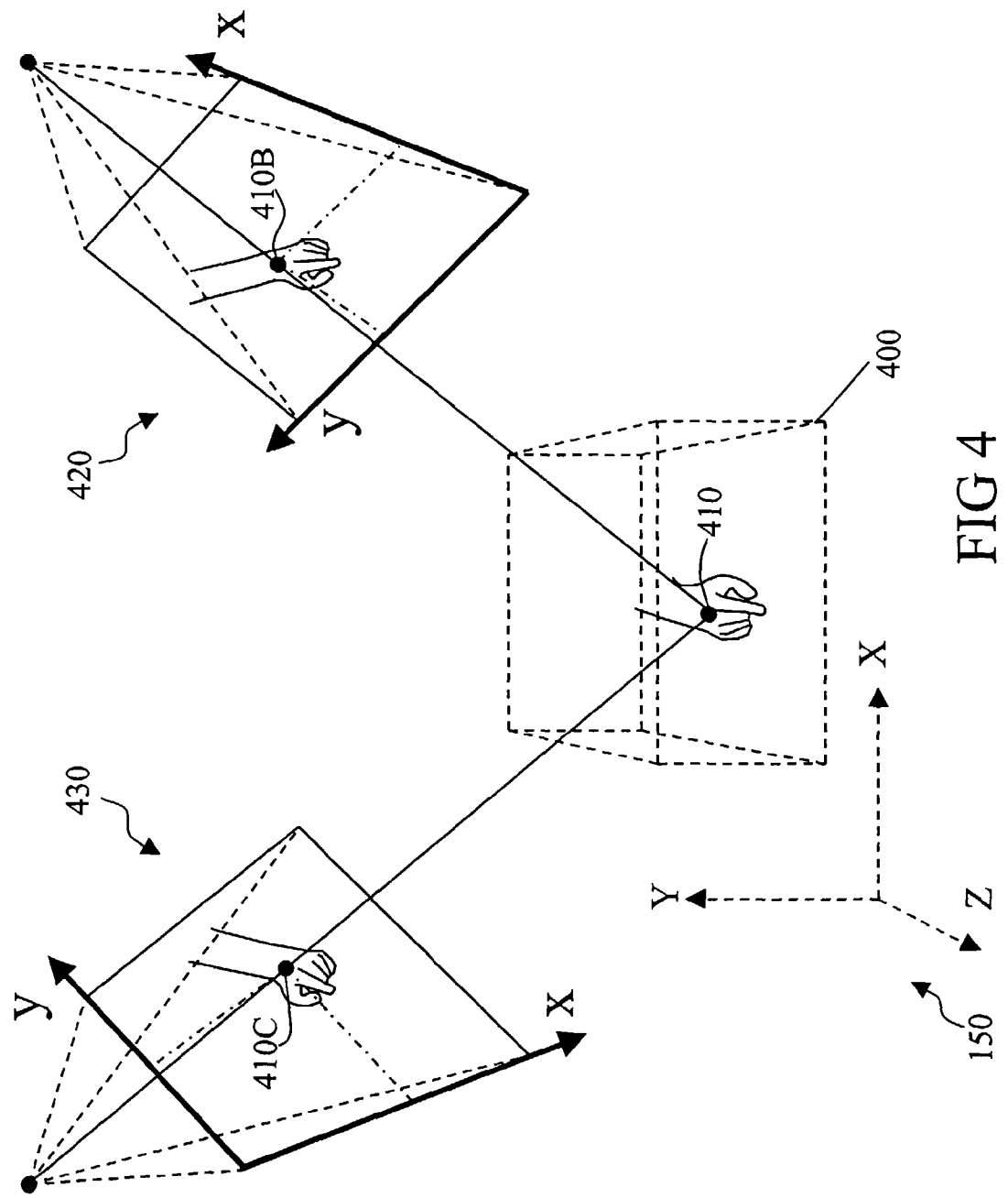
FIG. 4 illustrates the viewing geometry of the two cameras looking at the target hand that is being tracked in 3D. Shown also are the images that are being captured by the cameras.

As FIG. 4 illustrates, a volume in space 400 is defined that is visible in both cameras 110 and 120. Locations in this space, for example a point 410 on the palm of the users hand 100 is visible at the image location 410*b* in the image 420 as captured by the Left camera 110 and at location 410*c* in the image 430 as captured by the right camera 120. The location of the point 410 is related to the locations 410*b* and 410*c* by a mathematical projection functions that projects 3D space locations in the coordinate system 150 to 2D locations 410*b* and 410*c* in images 420 and 430 respectively. For illustration, these projections map a point in space along the viewing rays 440 and 450 onto the image sensors of the camera.

More specifically, we assume that the two cameras 110 and 120 are calibrated to the extent that we know the projection matrices, denoted by $P_L$ and $P_R$, that project from world coordinate vector to image coordinate vector. Furthermore we denote the said images 420 and 430 by $I_L$ and $I_R$ respectively. Given a point (e.g., 410) as a vector in homogenous world coordinates $R=(X,Y,Z,W)^T$ we denote the corresponding homogenous vector representation of that point (e.g., 410*b* and 410*c*) in the left and right camera image coordinates as $r_L=(x_L,y_L,w_L)$ and $r_R=(x_R,y_R,w_R)$. The image coordinate points are related to the world coordinate point by $r_L=P_L R$ and $r_R=P_R R$. The x and y coordinates in the images 420 and 430 of $r_L$ and $r_R$ are given by $s_L=(x_L/w_L, y_L/w_L)$ (410*b*) and $s_R=(x_R/w_R,y_R/w_R)$ (410*c*) according to the theory of projective geometry.

Projective geometry states, that we can obtain from the projected locations $r_L$ and $r_R$ of a point R, the corresponding 3D coordinate through triangulation. Most stereo algorithms rely on this principle by finding correspondences between two images and recovering depth through triangulation. However, finding correspondences between views is challenging, especially with wide baseline camera configurations. Simply said, it is very difficult for an apparatus or method to determine the location 410*c* of a point 410 on a person's hand in an image 430 if given an image 420 and location 410*b*.

The disclosed method and apparatus circumnavigates this problem in the following way: Given a hypothesized hand location in world coordinates R, the image data is used to measure the confidence in this hypothesis, i.e., the degree to which the image data supports the hypothesis that a hand is indeed present at the 2D locations corresponding to the world coordinate R. To increase the accuracy of the approach, a large number of such hypotheses are maintained and combined to get a statistical measure of the true hand location in world coordinate space.

More specifically, given a hand location R and the said projection matrices $P_L$ and $P_R$, we can project R into the left and right image coordinate system and analyze image observations $I_L[s_L]$ and $I_R[s_R]$ towards determining whether or not a hand is present at location R. The decision of whether or not a hand is present at R given $I_L[s_L]$ or $I_R[s_R]$ is based on color and motion information extracted from the images that are captured by cameras 110 and 120.

Color Cue

Picture elements (pixels) in images captured by the cameras $I_L$ and $I_R$ are assumed to be given by color triplets (Y,U,V). More specifically, a location $I_L[s]$ in the image contains three values $(Y_s,U_s,V_s)$ corresponding to the luminance and the two chrominance channels of the camera.

The color of the target to be tracked (the users hand in the described preferred embodiment) can be represented by a color histogram H. This histogram can for example be obtained as follows. An image/of the users hand is taken and locations in the image that are occupied by the hand are marked. The pixels at the marked locations $s_i$, namely, $I[s_i]=(Y_i,U_i,V_i)$ are inserted into a three channel histogram, i.e., one histogram $H_Y$ is created from values $Y_i$, a second one $H_U$ is created from values $U_i$ and a third one $H_V$ from values $V_i$ by appropriately inserting these values into histogram bins. Now, given a color image triplet $(Y_s,U_s,V_s)$ at a location s in an image (e.g., $I_L$) that may or may not be occupied by the hand of the user during tracking, a confidence measure of whether or not a hand is indeed present at that location is given by the function $$C(s) = \frac{H_Y[Y_s]H_U[U_s]H_V[V_s]}{\max H_Y \; \max H_U \; \max H_V}, \quad (1.1)$$

where $H_Y[Y_s]$ corresponds to amount of samples that were inserted into the bin in histogram $H_Y$ that corresponds to the value $Y_s$. The color feature image C(s) takes values between zero and one, where a value of one corresponds to the highest confidence of a hand being present at location s in the image. The color feature images created from the left or right camera image are denoted as $C_L$ and $C_R$ respectively.

Motion Cue

In addition to the color information, motion information is utilized for measuring whether or not a hand is present at a certain image location. Two images $I_{L,t}$ and $I_{L,t-dt}$ captured consecutively from a camera at time t with a short time interval dt between them (typically 33 ms) are used in the following manner: At an image location s at which motion is supposed to be measured, the color triplets are extracted from each of the two images, denoted as $(Y_{s,t},U_{s,t},V_{s,t})$ and $(Y_{s,t-dt},U_{s,t-dt},V_{s,t-dt})$. If an object moved in the image at the location s, these values will be different from each other. The size of this difference indicates how rapidly, the scene changes at that location. Hence, the function $$D(Y_{s,t},U_{s,t},V_{s,t},Y_{s,t-dt},U_{s,t-dt},V_{s,t-dt}) = \sqrt{(Y_{s,t-dt}-Y_{s,t})^2+(U_{s,t-dt}-U_{s,t})^2+(V_{s,t-dt}-V_{s,t})^2}$$

is small or zero, when there is little or no change in the scene and large if there is change, which is an indication for motion. This function is scaled to an interval of zero to one using $$M(s,t) = e^{-\frac{1}{\sigma}D(Y_{s,t},U_{s,t},V_{s,t},Y_{s,t-dt},V_{s,t-dt})}, \quad (1.2)$$

where the value σ determines the sensitivity of the motion cue. The motion feature images created from pairs of images of the left or right camera for time t are denoted as $M_L(s,t)$ and $M_R(s,t)$ respectively.

Figure 5:
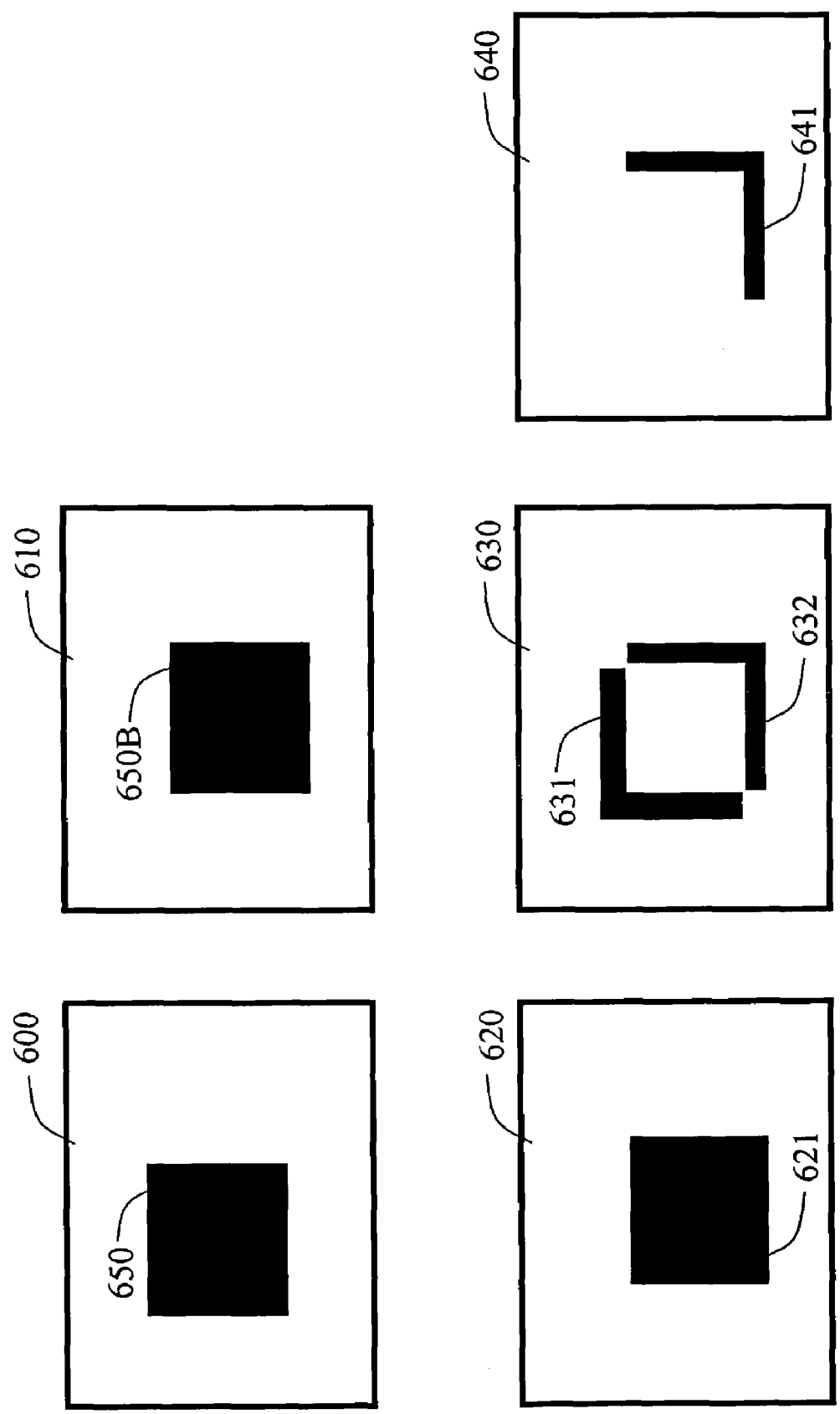
FIG. 5 illustrates the challenge of simply combining confidence estimates based on color and motion cues.

The final measure of confidence of observing a hand at location s in an image is given by a combination of the color and the motion cue at that location. The proposed method and apparatus is hence tuned towards tracking and locating targets that are moving and have a color according to the target color histogram. However, as illustrated in FIG. 5 on the example of a moving black rectangle, the color confidence image and the motion confidence image have to be post-processed before they can be utilized. The rectangle is shown as 650 at time t–dt in an image 600 captured by a camera and as 650B captured at a later time, time t, in an image 610 by the same camera. While the motion cue function M(s,t) (630) for this target tends to have high responses at the edges 631 and 632 of the target, the color cue function 620 tends to have high responses at the interior of the target 621. A logical or arithmetic combination of the two cues shown in image 640 only shows a response where both 620 and 630 show a response, i.e., where the cues intersect (at 641) if overlaid on top of each other.

Therefore, the color and the motion cues are spatially spread out using averaging before they are combined. Given an image 800 with each location in the image containing the value of a cue response, a new image 810 is generated, where a location contains the thresholded average of values in a neighborhood surrounding the location. In FIG. 7, location 801 has an associated neighborhood 805*a*, location 802 has a neighborhood 805*b* of the same size as 805*a* and location 803 has a neighborhood 805*c* of the same size as 805*a* and 805*b*. In the new image 810, after performing the averaging, location 801 contains a new non-zero value, because its neighborhood 805*a* contains image locations that also have non-zero values. For location 802 in the new image, the new value is zero, because neighborhood 805b in image 800 does not contain any non-zero image locations. Finally, location 803 in the new image 810 has a non-zero value, because its neighborhood 805c contains only non-zero image locations in image 800. The amount of spread is determined by the size of the neighborhood.

For the example of the rectangle in FIG. 5, this amounts to the result illustrated in FIG. 6. The spread out color cue image is shown in 700. The spread out motion cue image is shown in 710. A combination of the two spread out images now results in an image 720 where a combined response is not only present at some of the edged of the rectangle (as in 641 in FIG. 5) but also contains strong responses in the interior as shown in 720.

If we denote the spread out color cue image with CS(s,t) and the spread out motion cue image as MS(s,t), the final hand location confidence image is obtained via:

$$CONF(s,t) = w_c CS(s,t) + w_m MS(s,t) + (1 - w_c - w_e) CS(s,t) MS(s,t) \quad (1.3)$$

where the factors $w_c$ and $w_m$ weigh the contributions of the motion and color image cues. Here, CONF(s,t) is an image at time t that contains for each location s=(x,y) a measure of the confidence of a hand being present at the world location that projected to the image coordinate s.

Figure 8:
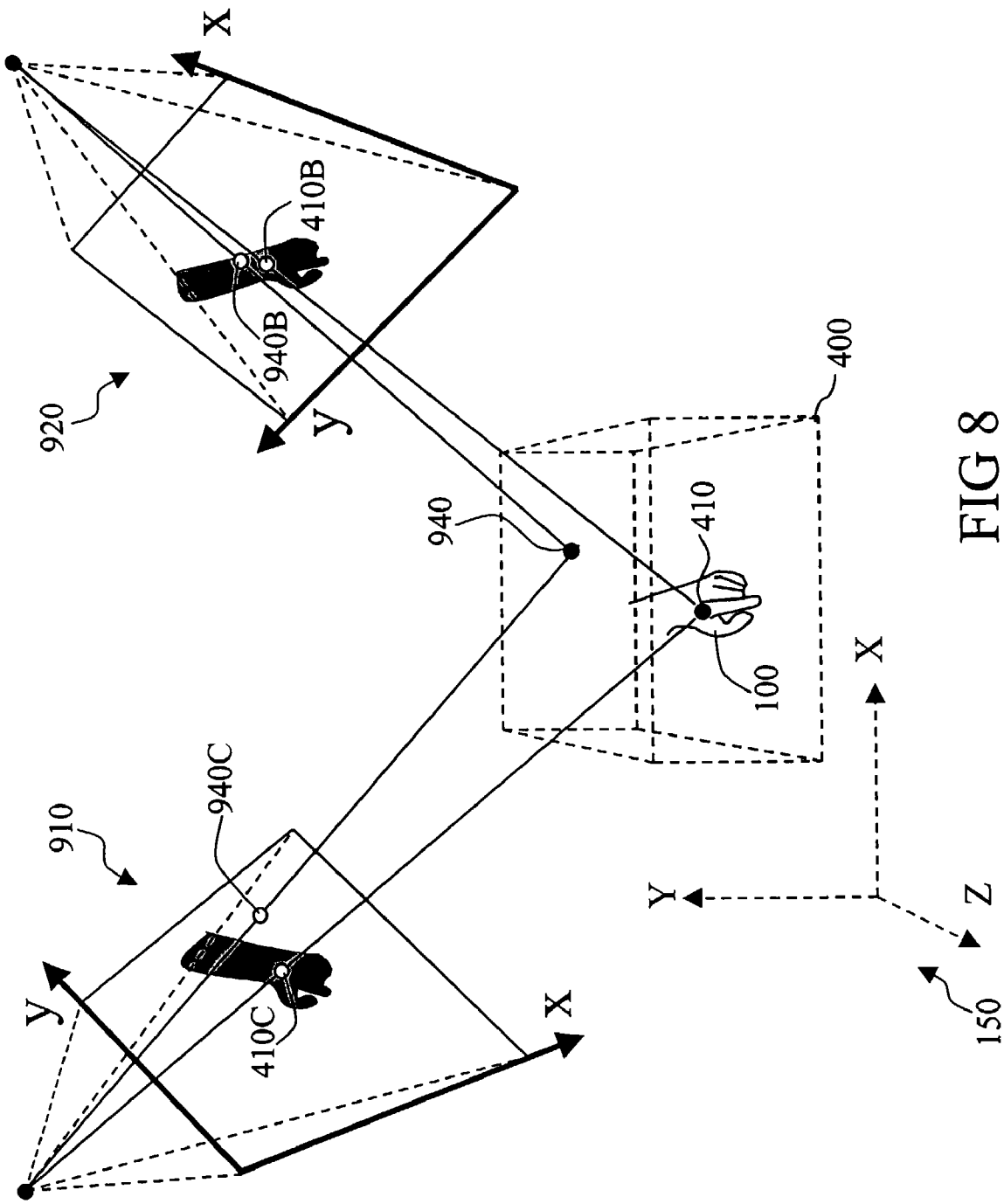
FIG. 8 illustrates how two cameras that capture confidence images can determined whether a point in space is located inside the hand or not.

Such a confidence image is calculated for each time step for both the right and the left camera. FIG. 8 illustrates the confidence images 910 and 920 that are captured by the left 110 and right 120 camera of the user's hand 100. Given now a location 410 on the users hand that projects to locations 410b and 410c in the left and right confidence image respectively, the presence of the hand is supported by the fact that both the left and the right confidence images 910 and 920 show a high confidence. In contrast, a location 940 not on the users hand, that projects to locations 940b in the left confidence image and to location 940c in the right image only shows a high confidence in one of the two cameras. Hence, the confidence of a hand being present at the location 940 is not well supported by the two confidence images as calculated by the image obtained from the two cameras.

This combination of confidence images $CONF_L(s,t)$ and $CONF_R(s,t)$ as obtained by the two cameras is utilized as follows: Given a location R=(X,Y,Z,1) in homogeneous world coordinates that projects to $s_L$ and $s_R$ in the left and right camera image respectively, the overall confidence of a hand being located at R is given by $$CONF_{LR}(s_L, s_R) = CONF_L(s_L, t) CONF_R(s_R, t). \quad (1.4)$$

The confidence function $CONF_{LR}(R)$ has large values for those locations in space R that are occupied by the target object. Furthermore, the function might also have large values at other locations that have a color that is similar to the color of the target object and/or are occupied by a moving object. The confidence function contains useful information because the target object is likely to be the object that leads to the largest and most confident region in space. The disclosed method assumes that the true target location is given as the central location of this assumed confident region and that the uncertainty about the location is given by a measure of the extent of this region.

Target Location Estimation

Figure 11:
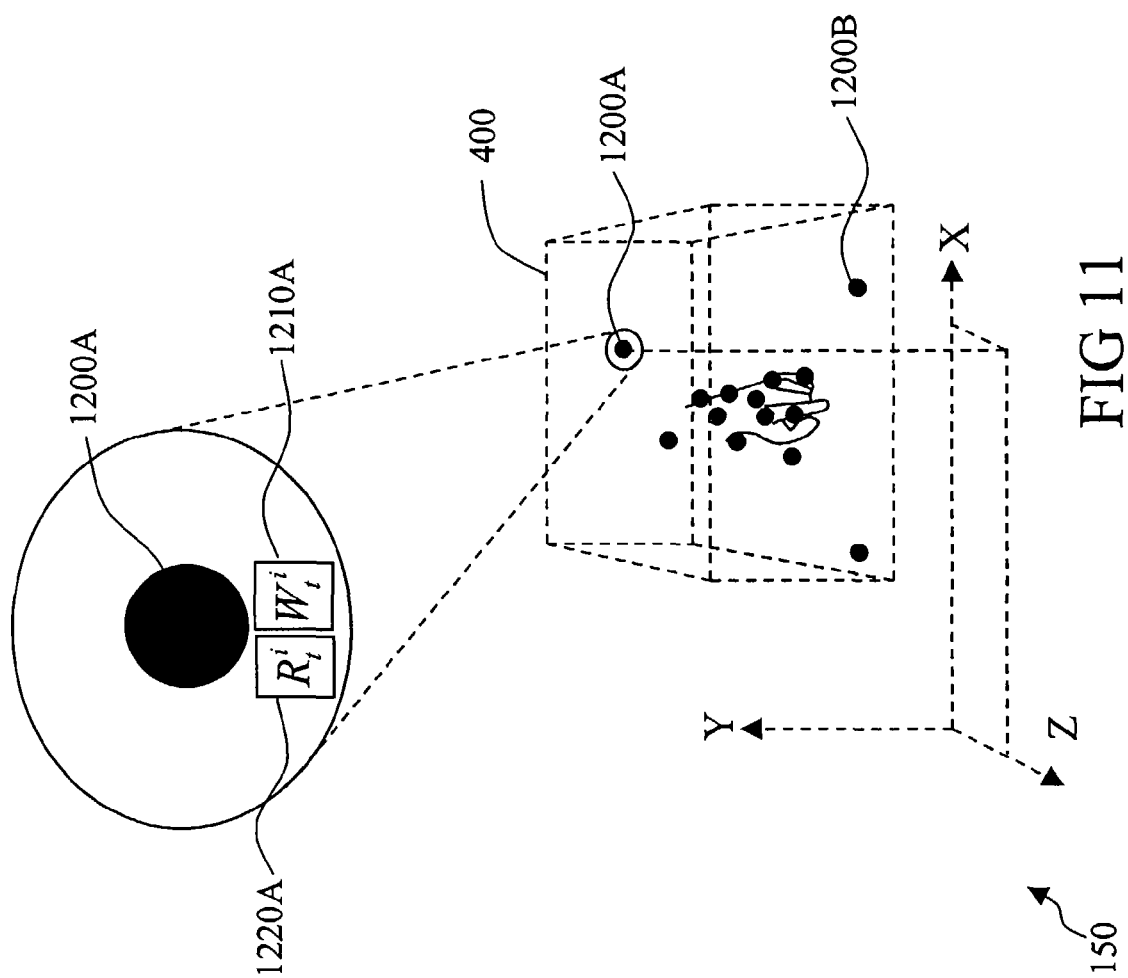
FIG. 11 illustrates hypotheses that are being used to determine the location of the target.

As illustrated in FIG. 11, the location of the target is estimated over time by maintaining a large number N of location hypotheses $H_i$ (1200a, 1200b, . . . ) distributed in viewing volume 400. In the illustration FIG. 11, the value is N=14 but in practice, this number is much larger. Each hypothesis $H_i$ has associated with it a location in space $R_t^i$ (1220a) and a weight $W_t^i$ (1210a) that is given by the confidence of that location divided by the sum of the confidences of all hypotheses combined such that their sum is one. The final target location at time t is given by the weighted mean of all location hypotheses $$TARGETLOC(t) = \sum_{i=1}^{N} W_t^i R_t^i.$$

The uncertainty about this location is given by the quantity $$UNCERTAIN(t) = \sqrt{\sum_{i=1}^{N} W_t^i (R_t^i - TARGETLOC(t))^2}.$$

Figure 12:
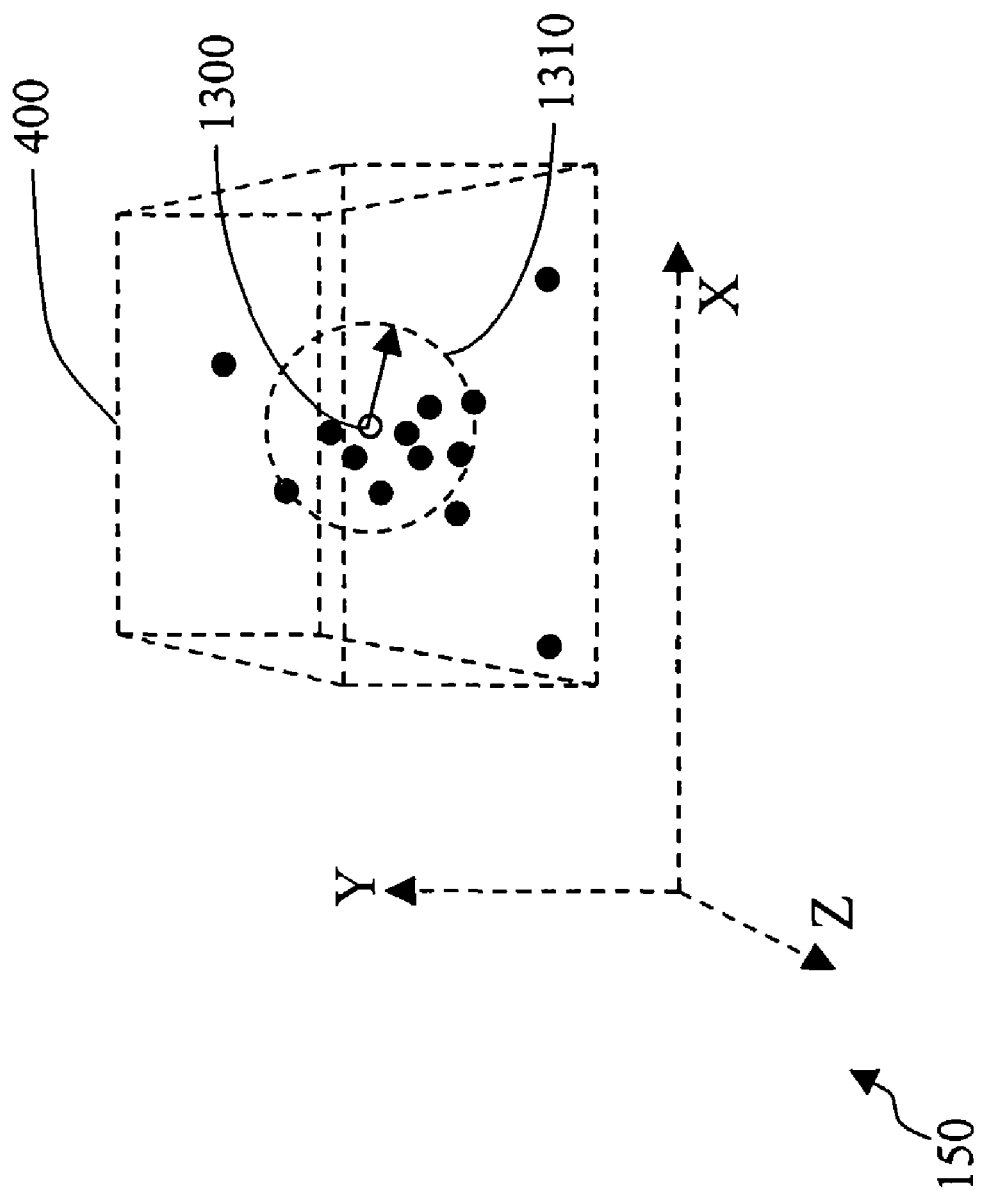
FIG. 12 illustrates the estimated target location together with a sphere that illustrates uncertainty of the target location.

The more concentrated the hypothesis $R_t^i$ are around the location TARGETLOC(t), the smaller the value UNCERTAIN(t). FIG. 12 illustrates what the target location 1300 and uncertainty radius 1310 based on the example hypotheses in FIG. 11.

Target Location Hypothesis Maintenance

The target location hypotheses $H_i$ are generated over time as follows: When the method starts (say at time t=0), and no information from the past is available, the $R_t^i$ at time t=0 are randomly distributed in the interaction volume 400. For all later times t>0, N new hypotheses are created from the N old hypotheses available from the previous time step t–dt as follows: For the creation of the i-th (i between 1 and N) hypothesis, a number j between 1 and N is randomly drawn such that the probability of drawing a number n is equal to the probability $W_{t-1}^n$. The location of the new i-th hypothesis is given by the location of the old hypothesis plus a small offset $\Delta R_t^i = (\Delta X_t^i, \Delta Y_t^i, \Delta Z_t^i)$, where each of the three offsets $\Delta X_t^i, \Delta Y_t^i, \Delta Z_t^i$ are randomly drawn between two numbers—OFFSET and +OFFSET (−5 mm and +5 mm for the preferred embodiment described here). The weight of the new hypotheses with location $R_t^i = R_{t-1}^j + \Delta R_t^i$ is given by the confidence function $CONF_{LR}(R,t)$.

Calibration

Figure 9:
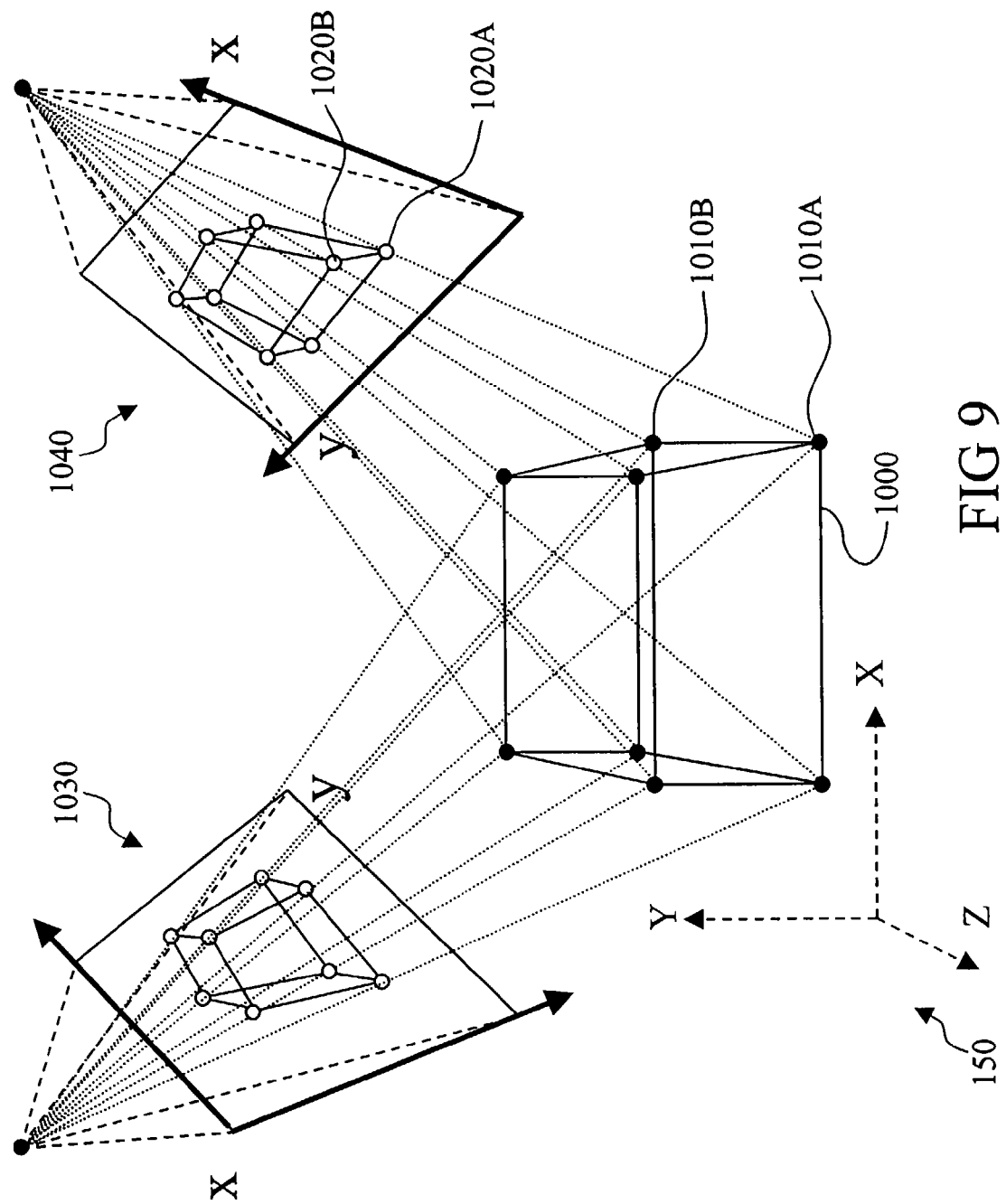
FIG. 9 shows a calibration target in the view of one of the system cameras.

The skin color model is obtained by sampling pixels from the users face as detected by the face detector. Alternatively, a generic skin color model that is representative for human skin could be employed. Finally, as illustrated in FIG. 9, the camera calibration matrices are obtained by placing a calibration target such as a cube (1000) with a set of NC calibration points (e.g., 1010a, 1010b) with known world coordinates $R_i^c$ in the viewing area. In FIG. 9, the calibration cube has $N_c$=8 calibration points. Given images of the calibration target captured by the two cameras 110 and 120, each calibration point projects to a certain location in that image (e.g., 1010a projects to 1020a etc.). Each calibration point $R_i^c$ projects to a location $r_{L,i}^C$ in the left image and $r_{R,i}^C$ in the right image. Then, the projections $P_L$ and $P_R$ that project points from the world coordinate system 150 to the left image coordinate system 1030 and the right image coordinate system 1040 can be determined by one with ordinary skill in the art. Using a cube shaped calibration target, the number of points would for example be $N_c$=8.

Figure 10:
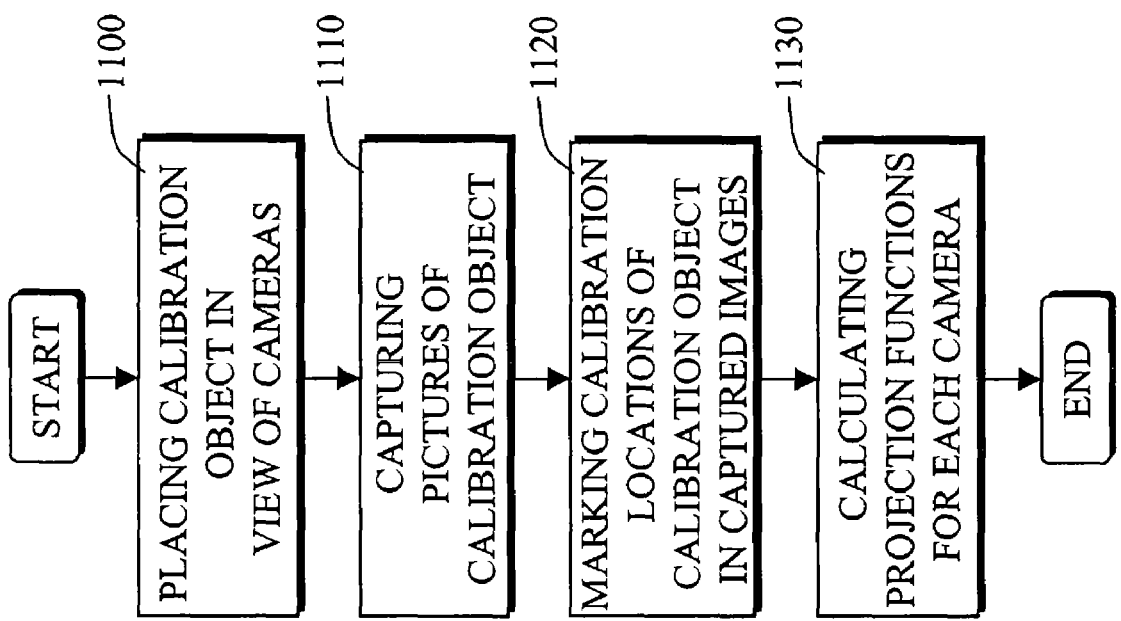
FIG. 10 shows the algorithm that is used to calibrate a camera.

As a summary, the calibration procedure for obtaining the projections for a camera is given in FIG. 10. First in step 1100, the calibration target (such as the cube shown in FIG. 9) is placed in the view of the camera. Then, in step 1110, a picture of the calibration target is captured with the camera under consideration. In step 1120, the image locations of the calibration points are determined manually and finally in step 1130, the projection is determined from the relation between the known calibration points and the image locations obtained in step 1120.

Summary of Target Location Estimation Algorithm

The summary of the target location estimation algorithm is shown in FIG. 13. When the method is started (step 1400) at time t=0, N hypotheses are initially randomly distributed in the viewing volume 400 defined by the two cameras 110 and 120. Then, for all subsequent times the following procedure is iterated. At a time t it is assumed that images $I_{L,t-dt}$ and $I_{R,t-dt}$ from a previous time step t−dt are available. New images $I_{L,t}$ and $I_{R,t}$ are captured in step 1410. Then in step 1415, based on images $I_L$ and $I_R$, the color feature images $C_L$ and $C_R$ are calculated, and based on the image pairs $I_L$ and $I_{L,t-dt}$, and $I_R$ and $I_{R,t-dt}$ the motion feature images $M_L$ and $M_R$ are calculated for time t. In step 1420, the obtained color and motion feature images are spread out spatially using the procedure previously presented in this disclosure. This yields the spread out color feature images $CS_L$, $CS_R$ and spread out motion feature images $MS_L$ and $MS_R$. In step 1430, the feature images are combined for each camera, obtaining confidence images $CONF_L$ and $CONF_R$. In step 1440, N new hypotheses are created from the hypotheses at the previous time step t−dt by randomly selecting previous hypotheses with probability equal to the hypothesis weights. The locations of the newly selected hypotheses are displaced randomly in step 1450. In step 1460, a new weight is calculated for each hypothesis using the function $CONF_{LR}$. The expected target location and target location uncertainties are finally calculated in step 1470 and the algorithm advances to the next time step.

We claim:

1. A method for visually tracking a target object in three dimensions, comprising the steps of:
    a) capturing the target object with two or more imaging sensors,
    b) maintaining a large number of 3D target location hypotheses,
    c) initially distributing a first set of 3D target location hypotheses randomly in spaces viewed by said imaging sensors,
    d) calculating locations of a second set of 3D target location hypotheses by adding offsets to locations of the first set of 3D target location hypotheses, wherein the offsets are randomly drawn between two numbers,
    e) projecting each of the second set of 3D target location hypotheses from 3D space to 2D image spaces of said imaging sensors,
    f) measuring confidences about a presence of the target object based on a combination of color and motion cues in each image captured by said imaging sensors, wherein the color and motion cues are spatially spread out using averaging before the color and motion cues are combined, and
    g) combining the measured confidences of the second set of 3D target location hypotheses to obtain a 3D location of the target object,
    wherein the 3D location of the target object is given by a weighted mean of all the second set of 3D target location hypotheses.

2. The method according to claim 1, wherein the step of e) projecting each of the second set of 3D target location hypotheses further comprises a step of utilizing projections that are obtained by calibrating said imaging sensors with respect to a reference coordinate system.

3. The method according to claim 1, wherein the method further comprises a step of calculating the color cues using a color model of the target object, wherein the color model of the target object is represented by a histogram that is estimated by collecting color samples of the target object.

4. The method according to claim 1, wherein the method further comprises a step of calculating the motion cues by measuring differences between the images captured sequentially by said imaging sensors.

5. The method according to claim 1, wherein the step of b) maintaining a large number of 3D target location hypotheses further comprises a step of creating a set of 3D target location hypotheses at each time step,
    wherein weights in the weighted mean of all 3D target location hypotheses are given by said confidences.

6. An apparatus for visually tracking a target object in three dimensions, comprising:
    a) means for capturing the target object with two or more imaging sensors,
    b) means for maintaining a large number of 3D target location hypotheses,
    c) means for initially distributing a first set of 3D target location hypotheses randomly in spaces viewed by said imaging sensors,
    d) means for calculating locations of a second set of 3D target location hypotheses by adding offsets to locations of the first set of 3D target location hypotheses, wherein the offsets are randomly drawn between two numbers,
    e) means for projecting each of the second set of 3D target location hypotheses from 3D space to 2D image spaces of said imaging sensors,
    f) means for measuring confidences about a presence of the target object based on a combination of color and motion cues in each image captured by said imaging sensors, wherein the color and motion cues are spatially spread out using averaging before the color and motion cues are combined, and
    g) means for combining the measured confidences of the second set of 3D target location hypotheses to obtain a 3D location of the target object,
    wherein the 3D location of the target object is given by a weighted mean of all the second set of 3D target location hypotheses.

7. The apparatus according to claim 6, wherein the e) means for projecting each of the second set of 3D target location hypotheses further comprises means for utilizing projections that are obtained by calibrating said imaging sensors with respect to a reference coordinate system.

8. The apparatus according to claim 6, wherein the apparatus further comprises means for calculating the color cues using a color model of the target object, wherein the color model of the target object is represented by a histogram that is estimated by collecting color samples of the target object.

9. The apparatus according to claim 6, wherein the apparatus further comprises means for calculating the motion cues by measuring differences between the images captured sequentially by said imaging sensors.

10. The apparatus according to claim 6, wherein the b) means for maintaining a large number of 3D target location hypotheses further comprises means for creating a set of 3D target location hypotheses at each time step,
    wherein weights in the weighted mean of all 3D target location hypotheses are given by said confidences.

* * * * *